United States Patent Office  3,271,121
Patented Sept. 6, 1966

3,271,121
ETHYLENE-STYRENE COPOLYMER AS
POUR POINT DEPRESSANT
David W. Young, Homewood, and George A. Uhl, Markham, Ill., assignors to Sinclair Research, Inc., New York, N.Y., a corporation of Delaware
No Drawing. Filed Mar. 14, 1963, Ser. No. 265,047
2 Claims. (Cl. 44—62)

The present invention relates to a novel hydrocarbon polymer having utility as a mineral oil pour point depressor. More specifically, the invention is directed to a pour depressor which is a mineral oil-soluble polymer of ethylene and styrene.

It is known in the art to add pour depressors to mineral oil bases in order to permit their flow at low temperatures. Many different types of materials depress the pour point of hydrocarbon oils but most have to be employed in disadvantageously large concentrations to provide the desired results. Moreover, although use of certain hydrocarbon polymers as pour depressors is known, most hydrocarbon polymers as demonstrated by U.S. Patent No. 3,048,479 to Ilnyckyj et al. are not effective as pour point depressors and many in fact increase the pour point.

It has now been found that a base oil-soluble polymer of about 10 to 90% by weight styrene and about 10 to 90% by weight ethylene, having a Staudinger molecular weight of about 1,000 to 40,000 when added to a base mineral oil in small effective amounts substantially reduces the pour of the oil. Preferably the polymer is of about 25 to 75% by weight styrene and 25 to 75% by weight ethylene and has a Staudinger Molecular weight of about 1500 to 10,000.

The novel copolymer of the present invention may be conveniently obtained by subjecting the ethylene and styrene in the defined proportions to high energy ionizing radiation, for instance at a temperature of about 10 to 325° C., preferably 15 to 50° C. The pressure of the reaction system may be about 500 to 10,000 p.s.i.g., preferably about 2,000 to 7,000 p.s.i.g. Generally, the irradiation dosage employed will be at least about 5,000,000 roentgens, preferably about 10,000,000 to 40,000,000 roentgens. Radiation dosages of greater than about 150,000,000 roentgens are usually avoided in that an oil-insoluble product may result. The radiation intensity utilized will generally be in the range of about 20,000 to 2,000,000 roentgens per hour, preferably about 30,000 to 500,000 roentgens per hour. The radiation times are of course dependent on the actual dosage desired and the dosage rate employed.

Of the variety of high energy ionizing radiation that can be employed in the preparation of the copolymer of this invention, gamma rays are preferred. These gamma rays may be derived from the radioactive decay of certain nautral or radioactive elements or isotopes such as radium 226, radium A, radium B, radium C, radium D, cobalt 60, cesium 137, cesium 134, europium 152–154, cerium 144, silver 110, thulium 170, tantalum 182, scandium 46, etc. or from chemical compounds of or materials containing such elements or isotopes. The gamma rays may also be derived from suitably shielded radiation produced in nuclear reactors, i.e. atomic piles, or from spent fuel elements obtained from the operation of such reactors. Examples of high energy ionizing radiation, other than gamma radiation that may be utilized are high energy neutrons, beta rays, alpha particles, high energy protons, high energy electrons, X-rays, etc.

The irradiation of the monomers may be carried out by a variety of procedures. For example, the radioactive source may be placed in a container provided with the mixture of the ethylene and styrene to carry out a batch operation or the radioactive source may be placed into a stream of the ethylene-styrene mixture to carry out a continuous process. Alternatively, the mixture of ethylene and styrene may be piped through an atomic reactor or pile as a continuous stream wherein the monomers are exposed to the neutrons and gamma rays. Many modifications of these procedures will be apparent to those skilled in the art. The utilization of radiation emitted by radioactive materials necessitates, of course, the provision of adequate radiation shielding means and techniques. Such means and techniques are, however, well known in the art and need not be described herein in detail.

An interesting and advantageous phenomenon exhibited by the polymers of the present invention resulting from the irradiation is that they may be unstable on standing and increase in viscosity and molecular weight to produce even more effective pour depressors. For instance, aging the polymer from the irradiation for 60 days approximately doubled its molecular weight and more than doubled its pour depressing effectiveness. The polymers are normally liquid but can on aging take on semi-solid characteristics. The kinematic viscosity of the polymers will generally be at least about 4 centistokes at 210° F., often about 4 to 600 centistokes at 210° F.

Among the mineral oil bases which are improved in accordance with this invention are normally liquid petroleum oils boiling primarily above the gasoline range and include, for instance, lubricating oils, diesel fuels, fuel oils, etc. These oils are usually petroleum middle distillates and commonly have relatively high pour points, for instance at least about −10° F. or higher. The oils can be in their relatively crude state or they can be treated in accordance with well-known commercial methods such as acid or caustic treatment, solvent refining, clay treatment, hydrotreating, etc. Fuel oils which can be improved by the polymers of this invention are, for instance, hydrocarbon fractions boiling primarily in the range of about 300° to 750° F. The fuel oils can be straight run distillate fuel oils, catalytically or thermally cracked distillate fuel oils or mixtures of straight run fuel oils, naphthas and the like with cracked distillate stocks. The cracked materials will frequently be about 15 to 70 volume percent of the fuel.

The amount of polymer added to the base oils is dependent upon the particular oil employed, but in all cases will be that sufficient to reduce the pour point significantly. Often the amounts used will fall in the range of about .01 to 1% or more by weight, preferably about 0.05 to 0.5% by weight.

The following examples are included to further illustrate the present invention.

*Example I*

13 grams of ethylene and 22 grams of styrene were pressurized into a stainless steel bomb at 620 p.s.i.g. and irradiated at room temperature by cobalt 60 gamma rays. The gamma ray intensity was about 200,000 roentgens/hr. and the roentgen dosage was 14 million roentgens. An oil-soluble colorless polymer oil resulted in 61% yield. The Staudinger molecular weight of the polymer was 2,400. The polymer in an amount of 0.12% by weight was blended with a No. 2 fuel oil and the pour point (ASTM method D–97–47) determined. The No. 2 fuel oil was blended of 50% straight run gas oil and 50% catalytically cracked gas oil which No. 2 fuel had a pour point of 0° F. The pour point of the polymer-containing No. 2 fuel oil was −45° F.

*Example II*

27 grams of styrene and 40 grams of ethylene were pressurized into a stainless steel bomb and irradiated as in Example I, but irradiation was continued until the dosage was 28.8 million roentgens. A 45% yield of a colorless polymer having a Staudinger molecular weight of 1800 was obtained. 0.2 percent by weight of the polymer was added to the No. 2 fuel oil of Example I and was found to reduce the pour point of the fuel oil by 40° F.

We claim:

1. A hydrocarbon fuel oil distillate boiling primarily in the range of about 300° to 750° F. containing a small amount of a mineral oil-soluble polymer of about 10 to 90% by weight styrene and about 10 to 90% by weight ethylene, said copolymer having a Staudinger molecular weight of about 1,000 to 40,000 and being prepared by subjecting said styrene and said ethylene to a gamma ray dosage of at least about 5,000,000 roentgens to obtain said oil-soluble product and said amount being sufficient to provide the oil with a reduced pour point.

2. The composition of claim 1 wherein the copolymer is of about 25 to 75% by weight of styrene and 25 to 75% by weight ethylene.

References Cited by the Examiner

UNITED STATES PATENTS

| | | | |
|---|---|---|---|
| 2,563,631 | 8/1951 | Young et al. | |
| 2,746,925 | 5/1956 | Garber et al. | 252—59 |
| 2,814,595 | 11/1957 | Beerbower et al. | 252—59 |
| 2,982,730 | 5/1961 | Barry | 204—162.1 |
| 2,996,455 | 8/1961 | Brown et al. | 252—59 |
| 3,018,236 | 1/1962 | Shewmaker et al. | 204—162.1 |
| 3,112,297 | 11/1963 | Gordon et al. | 260—88.2 |
| 3,117,945 | 1/1964 | Gorham et al. | 260—45.5 |

DANIEL E. WYMAN, *Primary Examiner.*

MURRAY TILLMAN, *Examiner.*

P. P. GARVIN, N. F. OBLON, *Assistant Examiners.*